United States Patent
Qi et al.

(10) Patent No.: US 7,968,167 B2
(45) Date of Patent: Jun. 28, 2011

(54) COATED SEAL FOR SEALING PARTS IN A VEHICLE ENGINE

(75) Inventors: Yue Qi, Troy, MI (US); Pui-Kei Yuen, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 12/604,031

(22) Filed: Oct. 22, 2009

(65) Prior Publication Data

US 2011/0095490 A1    Apr. 28, 2011

(51) Int. Cl.
*B32B 3/02* (2006.01)

(52) U.S. Cl. ....... 428/66.4; 123/472; 123/467; 277/626; 156/307.7

(58) Field of Classification Search .................. 428/66.4; 123/472, 467; 156/307.7, 309.6; 277/626
See application file for complete search history.

(56) References Cited

U.S. PATENT DOCUMENTS

| | | | | |
|---|---|---|---|---|
| 3,365,355 A | * | 1/1968 | Netsch | 428/415 |
| 4,096,227 A | * | 6/1978 | Gore | 264/110 |
| 4,385,093 A | | 5/1983 | Hubis | |
| 4,478,665 A | | 10/1984 | Hubis | |
| 4,985,293 A | * | 1/1991 | Keep | 428/209 |
| 5,492,336 A | | 2/1996 | Barna et al. | |
| 5,551,706 A | | 9/1996 | Barna et al. | |
| 5,792,525 A | * | 8/1998 | Fuhr et al. | 428/35.7 |
| 5,879,789 A | | 3/1999 | Dolan et al. | |
| 6,092,811 A | | 7/2000 | Bojarczuk et al. | |
| 6,258,413 B1 | | 7/2001 | Woelki et al. | |
| 6,500,532 B1 | | 12/2002 | Ruefer et al. | |
| 6,607,830 B2 | * | 8/2003 | Murakami et al. | 428/422 |
| 6,640,784 B1 | | 11/2003 | Sims, Jr. | |
| 6,715,772 B1 | | 4/2004 | Micciche et al. | |
| 6,994,356 B2 | | 2/2006 | Veiga | |
| 7,087,136 B2 | * | 8/2006 | Tippett | 156/309.6 |
| 7,341,258 B2 | | 3/2008 | Holt et al. | |
| 7,360,398 B2 | * | 4/2008 | Borali | 73/31.07 |
| 7,363,914 B2 | * | 4/2008 | Hoffmann et al. | 123/467 |
| 7,365,167 B2 | * | 4/2008 | Watkins et al. | 530/387.3 |
| 2004/0084850 A1 | | 5/2004 | Lang et al. | |
| 2005/0121859 A1 | | 6/2005 | Seidel et al. | |

(Continued)

FOREIGN PATENT DOCUMENTS

JP    11-80705    3/1999

OTHER PUBLICATIONS

W.L. Gore, & Associates, "Self-lubricating bearing liner material reduces friction," Tribology & Lubrication Tech mag pub by STLE, Aug. 2005, www.stle.org (2 pages).

*Primary Examiner* — N. Edwards
(74) *Attorney, Agent, or Firm* — Dierker & Associates, P.C.

(57) ABSTRACT

A coated seal for sealing parts in a vehicle engine is disclosed herein. The seal includes a seal body portion including glass fiber-filled polytetrafluoroethylene, carbon-filled polytetrafluoroethylene, molybdenum disulfide-filled polytetrafluoroethylene, bronze-filled polytetrafluoroethylene or combinations thereof; and a coating portion including either expanded polytetrafluoroethylene, carbon-filled polytetrafluoroethylene, or combinations thereof. A method of using a coated seal in a vehicle engine is also disclosed herein. A system to achieve decreased friction, decreased noise, and improved wear in injector seals in a vehicle engine is also disclosed herein.

20 Claims, 4 Drawing Sheets

U.S. PATENT DOCUMENTS

| | | | |
|---|---|---|---|
| 2007/0040338 A1* | 2/2007 | Dove | 277/626 |
| 2007/0170658 A1 | 7/2007 | Wilkinson | |
| 2007/0176372 A1 | 8/2007 | Raciot | |
| 2007/0205563 A1 | 9/2007 | Dietle et al. | |
| 2007/0296153 A1 | 12/2007 | Kurth et al. | |
| 2008/0029974 A1 | 2/2008 | Bowen et al. | |
| 2008/0122184 A1 | 5/2008 | Hocker et al. | |
| 2009/0309261 A1* | 12/2009 | Hatch | 264/279 |

* cited by examiner

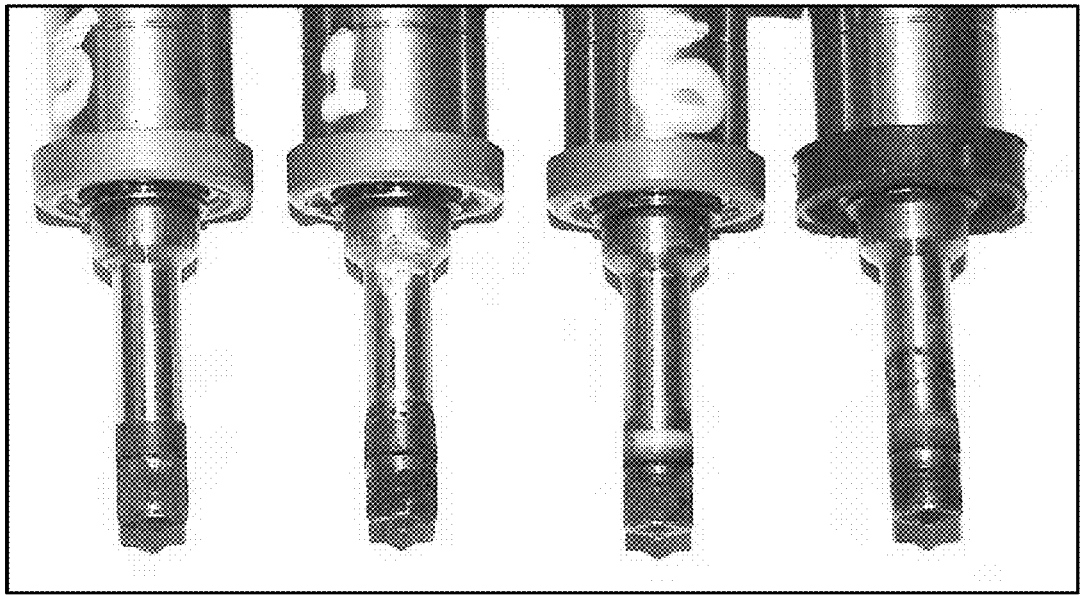
FIG. 4A  FIG. 4B  FIG. 4C  FIG. 4D
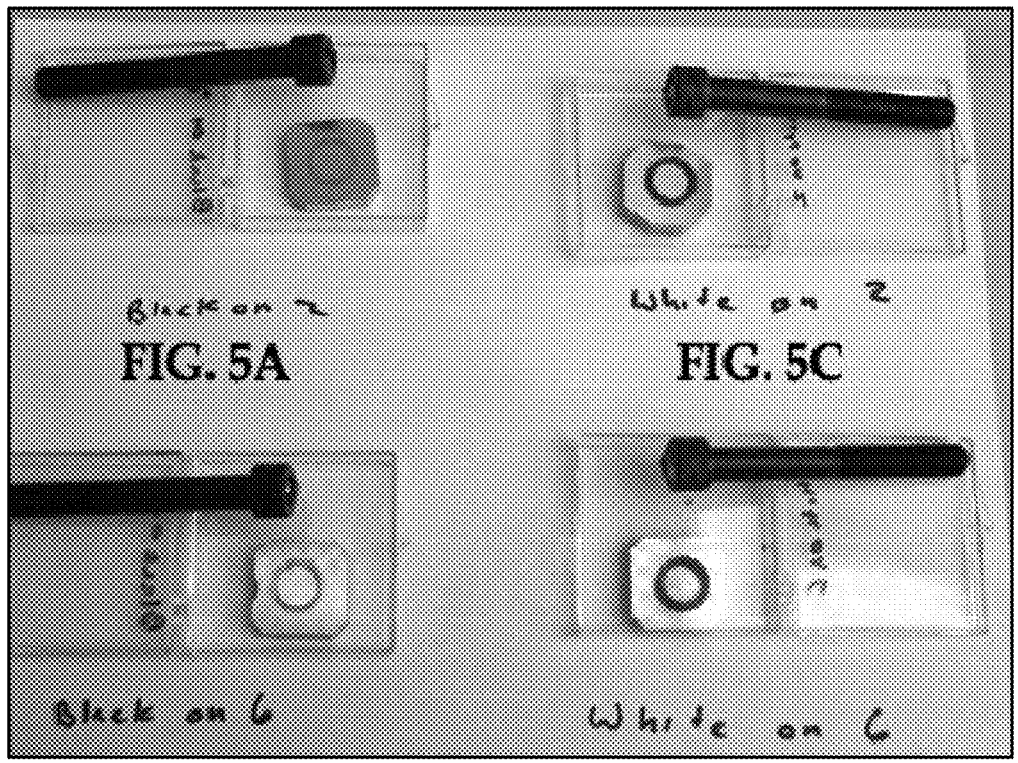
FIG. 5A  FIG. 5C
FIG. 5B  FIG. 5D

COATED SEAL FOR SEALING PARTS IN A VEHICLE ENGINE

TECHNICAL FIELD

The present disclosure relates generally to a coated seal used to seal parts in a vehicle engine.

BACKGROUND

Polytetrafluoroethylene (PTFE) is known to be useful as a tough, low-friction material. There have been opportunities for use of this material in systems, such as automobile and jet engines, where metal, rubber and polymer parts move closely together at high velocity and at high pressure.

SUMMARY

A coated seal for sealing parts in a vehicle engine is disclosed herein. The coated seal includes a seal body portion including glass fiber-filled PTFE, carbon-filled PTFE, molybdenum disulfide-filled PTFE, bronze-filled PTFE or combinations thereof. The coated seal also includes a coating portion adhered to at least one side of the seal body portion, the coating portion forming from about 5 volume percent to about 25 volume percent of the coated seal, the coating portion including expanded PTFE, carbon-filled PTFE or combinations thereof, the coating portion having a coefficient of friction of less than 0.25 when subjected to a pressure of about 100 MPa for a total travel distance of at least 380 meters at a sliding speed of 0.2 meters/second.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A, 4B, 4C and 4D are comparative photographs taken after tests of isolated-type SIDI injectors with carbon-filled PTFE (black) and glass filled PTFE (white) seals;

FIGS. 5A, 5B, 5C and 5D are comparative photographs taken after pin on disk friction tests of four separate aluminum segments respectively positioned with four separate seals;

DETAILED DESCRIPTION

Conventional Spark Ignition Direct Injection (SIDI) fuel injectors are rigidly, solidly mounted onto structures of the engine of an automotive vehicle such as the cylinder head. As such, the pressure pulsations and noises from the injectors as they operate are mostly transmitted to the engine in a direct manner. Thus, negative issues relating to noise, vibration and harshness (NVH) may exist for the conventional SIDI system. By the same token, the seals used on these injectors, such as the combustion seals that seal the injector against the injector bore, do not need to tolerate much irregular motion, if any, because of the injector's rigid mounting to the engine block. This rigid mounting allows transmission of NVH, for the most part, directly to the engine. The primary function of the seal is to seal against pressure pulsations and gases from the internal combustion process which can average around 25-30 bar but can be as high as 300 bar (30 MPa).

In contrast, an isolated-type SIDI system has the injectors mounted to the engine in an isolated or suspended manner so that the NVH generated is more easily absorbed by the injector itself and the fuel system, and subsequently not transmitted as readily to other parts of the engine. The injector is thus suspended in a manner that leaves it relatively free to have some relative motion with respect to the engine, mainly in the vertical, up and down directions, but also motion such as horizontal and side-to-side motion. Because of this relative freedom of motion, the combustion seal of the injector needs to be able to tolerate the various motions and forces generated by the suspension mechanism of the isolated-type SIDI system.

The coated seal of the present disclosure can be readily used in either the injectors of conventional or isolated-type SIDI systems. Its coating is particularly well suited to be able to handle the injection suspension mechanism of the isolated-type SIDI system. It can also be used to seal injectors used in the intake ports of port fuel injection (PFI) engines.

An embodiment of the present disclosure is a coated seal for sealing parts in a vehicle engine. In another embodiment, the coated seal can be used as an injection seal in a SIDI injection system and in an isolated-type SIDI injection system.

Figure 1:
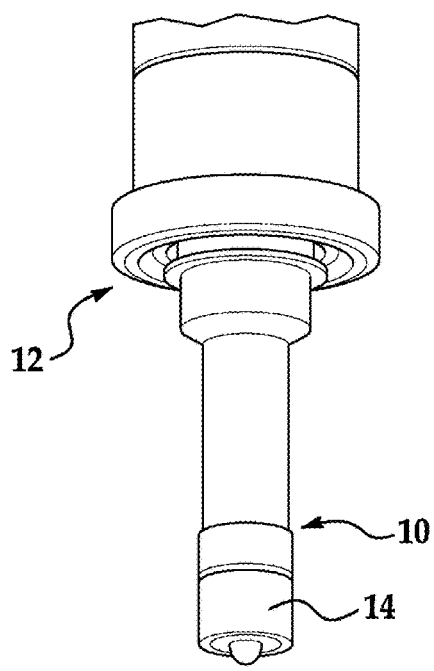
FIG. 1 is a cutaway perspective view of the insertable portion of an isolated-type spark ignition direct injection (SIDI) injector according to an embodiment of the present disclosure.

FIG. 1 is an embodiment of the present disclosure showing a perspective view of the insertable portion of an SIDI injector 12. Specifically, the coated seal 10 can be used on an injector 12 in an SIDI system or in an isolated-type SIDI system. It is to be understood that the coated seal 10 may be used either as a dynamic or a static seal. In FIG. 1, there is one coated seal 10. In an alternate embodiment of an injector 12, the injector 12 can also be double sealed with two seals 10 positioned adjacent to each other on the injector 12 to cover a larger area and offer more effective sealing capability against the pressure from liquids and gases from the combustion process.

In the above embodiments, the injector body 12 extends to form a tip 14, a portion of which is surrounded or coated by the seal 10. For the SIDI or isolated-type SIDI injection system, the injector tip 14 including the seal 10 is inserted into a bore leading into the combustion chamber of the engine. The seal 10 tolerates friction and wear induced by the dynamic motion of the injector body 12 as it repeatedly pulses inside the injector bore. The seal 10 also tolerates the combustion pressures, and random side-to-side horizontal pressures that are also occasionally exerted during the dynamic motion of the injection body 12 in the injector bore.

Figure 2A:
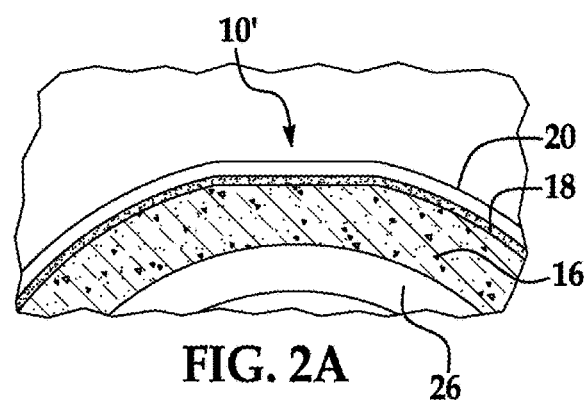
FIG. 2A is an enlarged, cross-sectional cutaway view of the coated seal according to an embodiment of the present disclosure.
Figure 2B:
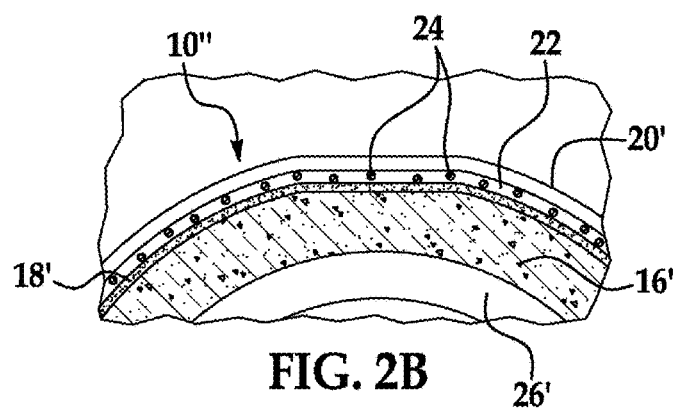
FIG. 2B is an enlarged, cross-sectional cutaway view of the coated seal according to an embodiment of the present disclosure.
Figure 2C:
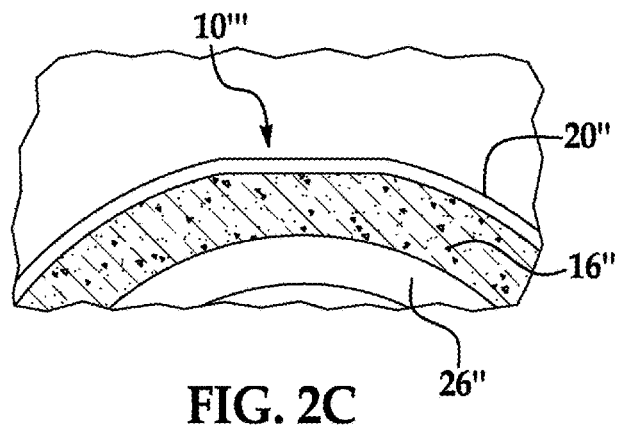
FIG. 2C is an enlarged, cross-sectional cutaway view of the coated seal according to an embodiment of the present disclosure.

FIGS. 2A, 2B and 2C are cutaway cross sectional views of three respective embodiments of the coated seal 10', 10", 10'". In each of the embodiments shown in FIGS. 2A, 2B and 2C respectively, a seal body portion 16, 16', 16" surrounds a core 26, 26', 26", which represents a portion of the tip 14 shown in FIG. 1.

For any of the embodiments herein, the seal body portion 16, 16', 16" may be selected from any suitable materials. However, in an embodiment, seal portion 16, 16', 16" is selected from the group consisting of glass fiber-filled PTFE, carbon-filled PTFE, molybdenum disulfide-filled PTFE, bronze-filled PTFE, and combinations thereof. In a further embodiment, the carbon in the carbon-filled PTFE seal body portion 16, 16', 16" is graphite. One non-limiting example of a suitable graphite material is high purity coke powder.

For any of the embodiments herein, a coating portion 20, 20', 20" may be adhered to the seal portion 16, 16', 16". It is to be understood that coating portion 20, 20', 20" may be selected from any suitable materials. However, in an embodiment, the coating portion may be selected from the group consisting of ePTFE, carbon-filled PTFE and combinations thereof that satisfy the wear resistant requirements (for example, about 100 MPa contact pressure and 380 meters total traveling distance at a sliding speed of 0.2 m/s).

Referring now to FIG. 2A, in the embodiment shown of the seal 10' of the present disclosure, adhered to the seal body portion 16 surrounding the core 26 is a coating portion 20. A layer of adhesive 18 may be used to adhere the coating portion 20 to the seal body portion 16. The adhesive in the adhesive layer 18 may be a polymer-based adhesive. In an embodiment, the adhesive is a thermosetting epoxy resin.

Referring now to FIG. 2B, in the embodiment shown of the seal 10" of the present disclosure, adhered to the seal body portion 16' surrounding the core 26' is a coating portion 20'. An inner portion 22 of the coating portion 20' includes ePTFE having pores 24 therein. A polymer-based adhesive may substantially or completely fill the pores 24, thus forming a composite of ePTFE and the polymer-based adhesive. In an embodiment, the adhesive from the adhesive-filled pores 24 provides at least part of the adhesive for the adhesive layer 18', which layer 18' adheres the coating portion 20' to the seal body portion 16'. The adhesive in the adhesive-filled pores 24 may be a thermosetting epoxy resin in an example. In yet another embodiment, the polymer-based adhesive (e.g., a thermosetting epoxy resin as mentioned above) functions as a load-bearing partner to the porous ePTFE, in addition to, or instead of providing at least some of the adhesive in the adhesive layer 18'.

Referring now to FIG. 2C, in the embodiment shown of the seal 10'" of the present disclosure, adhered to the seal body portion 16" surrounding the core 26" is a coating portion 20". In this embodiment, the coating portion 20" directly adheres to the seal body portion 16", without the adhesive layer 18, 18' shown in FIGS. 2A and 2B. The adhesion between the coating portion 20" and the seal body portion 16" is accomplished by applying the coating portion 20" against the seal body portion 16" with heat and pressure.

For example, in an embodiment where both the coating portion 20, 20', 20" and the seal body portion 16, 16', 16" are chemically similar materials (e.g., both formed from PTFE-based materials), the coating portion and seal body portion may be hot pressed together.

In yet another embodiment, the coating portion 20, 20', 20" may be adhered as a sheet, an extrudate, or a tape applied to at least one side of the seal body portion 16, 16', 16".

The design of the SIDI injection system, a non-limiting example of which is the isolated-type SIDI injection system, has been found to be efficient for noise reduction in a vehicle engine. However, it has also been found that the SIDI design can induce micro-motion between the injector seal 10, 10', 10", 10'" and the injector bore in a vehicle engine. In order to minimize the effects of this micro-motion, the present inventors have recognized that seal materials need to have low friction and high wear resistance against the injector bore, which is typically made of cast aluminum alloys or iron.

Uncoated glass fiber-filled PTFE (white) has been evaluated for use as a seal for the SIDI injection system. Such uncoated white PTFE, although functional, has demonstrated excessive wear and friction with resulting reduced sealability and durability.

Better results were obtained when uncoated carbon-filled PTFE (black) was used as a seal for the SIDI injection system. The seal of uncoated black PTFE demonstrated lower friction and higher wear resistance than the seal of uncoated white PTFE.

Similarly good results were obtained when a coating portion 20 of ePTFE was adhered onto a seal body portion 16 of glass fiber-filled PTFE to form a coated seal 10'. Following a similar process, a coating portion 20 of carbon-filled PTFE was adhered onto a seal body portion 16 of glass fiber-filled PTFE. The results for this coated seal 10' were similar to the above-described results for the coated seal 10' with the ePTFE. The present inventors thus found that the wear-resisting, friction-lowering benefits of ePTFE and carbon-filled PTFE can be obtained by adhering a coating portion 20, 20', 20" of either ePTFE or carbon-filled PTFE to a seal body portion 16, 16', 16" of a less wear-resistant, less friction-lowering and usually less expensive material, as described above.

Thus, similarly good results can be obtained when any of various seal body portion 16, 16', 16" materials were coated with a coating of either carbon-filled PTFE or ePTFE and used as a seal 10, 10', 10", 10'" with the coating as the area of contact with an injector bore of a combustion chamber. In fact, in an embodiment, the outer surface of such coated seals 10, 10', 10", 10'" have been found to have a coefficient of friction of less than 0.25 when subjected to a pressure of about 100 MPa for a total travel distance of at least 380 meters at a sliding speed of 0.2 meters/second. By "about" in reference to the pressures herein is meant +/−10 MPa. In yet another embodiment, the outer surface of such coated seals 10, 10', 10", 10'" has been found to have a coefficient of friction of less than 0.1 when subjected to a pressure of approximately 100 MPa for a total travel distance of at least 380 meters at a sliding speed of 0.2 meters/second.

It is to be understood that the coating portion 20, 20', 20" of the coated seal 10, 10', 10", 10'" may form any suitable amount of the coated seal 10, 10', 10", 10'". In an embodiment of the present disclosure, the coating portion 20, 20', 20" of the coated seal 10, 10', 10", 10'" forms from about 5 volume percent to about 25 volume percent of the coated seal 10, 10', 10", 10'". In an alternate embodiment, the coating portion 20, 20', 20" of the coated seal 10, 10', 10", 10'" forms from about 10 volume percent to about 20 volume percent of the coated seal 10, 10', 10", 10'". By "about" as used here is meant +/−3 vol %.

In another embodiment of the present disclosure, the coating portion 20, 20', 20" includes ePTFE, carbon-filled PTFE, or combinations thereof, and the coating portion 20, 20', 20"

may have any suitable thickness, e.g., ranging from about 0.004 inch to about 0.012 inch on the coated seal 10, 10', 10", 10'". By "about" as used here is meant+/−0.002 inch. In a further embodiment, when the coating portion 20, 20', 20" includes carbon-filled PTFE, the carbon in the carbon-filled PTFE coating portion 20, 20', 20" is from about 10 volume percent to about 30 volume percent of the coating portion 20, 20', 20". By "about" as used here is meant+/−5 vol %. In yet a further embodiment, the carbon in the carbon-filled PTFE coating portion 20, 20', 20" is graphite. One non-limiting example of a suitable graphite material is high purity coke powder.

In yet another embodiment of the present disclosure, when the seal body portion 16, 16', 16" includes glass fiber-filled PTFE, the glass fibers are from about 5 volume percent to about 30 volume percent of the seal body portion 16, 16', 16". By "about" as used here is meant+/−2 volume percent.

Another embodiment of the present disclosure relates to a method of using a coated seal 10, 10', 10", 10'" in a vehicle engine. An embodiment of the method includes operatively disposing the coated seal 10, 10', 10", 10'" directly to at least one surface of an injector 12 in a vehicle engine. In another embodiment, the coated seal 10, 10', 10", 10'" is applied as a combustion seal or an injection seal in a SIDI injection system or an isolated-type SIDI injection system.

Embodiment(s) of the coated seal 10, 10', 10", 10'" of the present disclosure are configured to tolerate repeated vertical pulsing up and down and combustion pressures, as well as random side to side horizontal pressures in an injector bore of a vehicle engine. The coated seal 10, 10', 10", 10'" is configured to enable the injector 12 to function with decreased friction, decreased noise and improved wear.

Another embodiment of the present disclosure relates to a system to achieve decreased friction, decreased noise, and improved wear resistance in injector seals 10, 10', 10", 10'" in a vehicle engine. The system includes the coated seal 10, 10', 10", 10'" as described herein, operatively disposed as an injector seal on an injector 12 of a vehicle engine.

To further illustrate embodiment(s) of the present disclosure, the following examples are given herein. It is to be understood that these examples are provided for illustrative purposes and are not to be construed as limiting the scope of the disclosed embodiment(s).

EXAMPLES

Example 1

In order to compare the Coefficient of Friction (COF) for three different PTFE seals, data was gathered according to the following procedure. The three different PTFE seals being compared were an ePTFE coated seal 10', an amorphous carbon-filled PTFE seal and a glass fiber-filled PTFE seal. In order for the Coefficient of Friction to be determined, load was applied to the PTFE seals. A steel ball slightly larger than the inner diameter of the seal was pushed and super glued into each of the seals. They were then set inside a pin-holder with the outer diameter surface of the seal exposed as the pin-tip, which ran against the machined aluminum disks with surface roughness ranging from Rz=2 µm, 6 µm to 20 µm. A load was applied to the contact surface. The contact pressure was estimated to be around 100 MPa or below. Because higher load leads to faster wear rate (although very low), the overall film/coating thickness was calculated based on its wear rate and required durability (travel length and time) for a travel distance of at least 380 meters. Furthermore, the sliding speed was 0.2 m/s, and the test temperature was 150° C.

Figure 3:
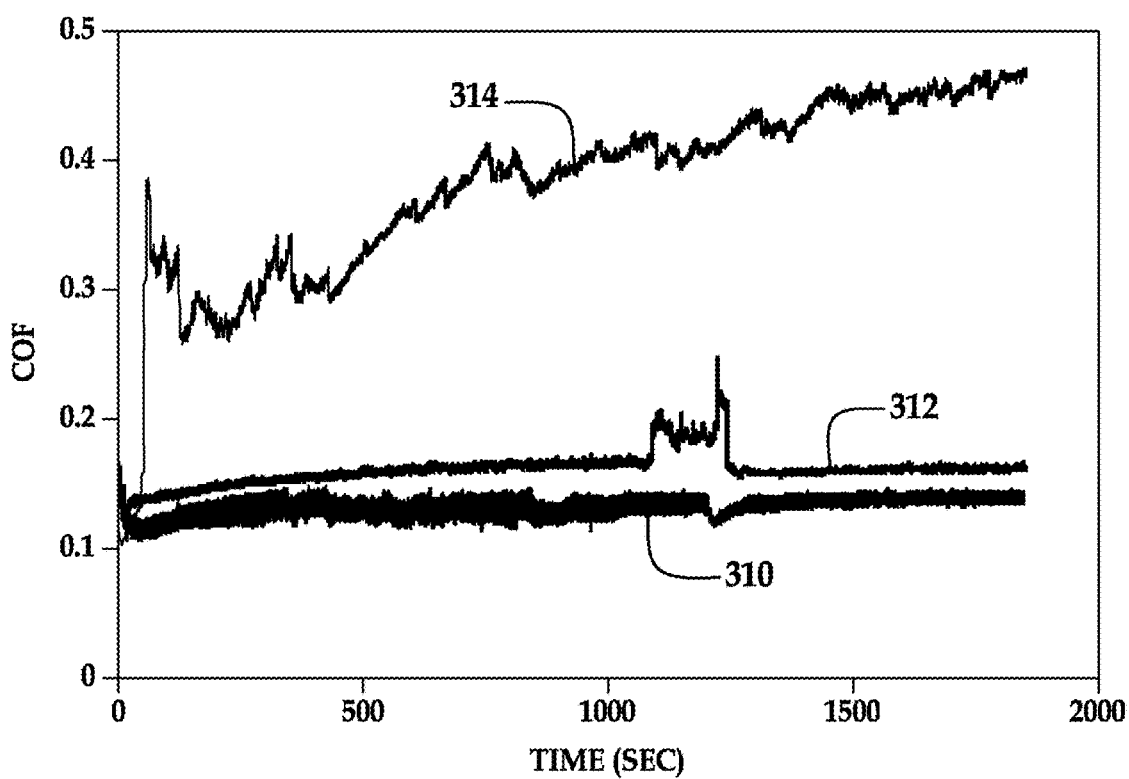
FIG. 3 is a graph of Coefficient of Friction (COF) versus time (seconds) according to an embodiment of the present disclosure.

FIG. 3 was plotted based on the data gathered according to the procedure above. FIG. 3 is a graph which plots the Coefficient of Friction (COF) over time for three different PTFE seals. The vertical axis measures Coefficient of Friction and the horizontal axis measures time. The three different PTFE seals being compared are an ePTFE coated seal 10', an amorphous carbon-filled PTFE seal, and a glass fiber-filled PTFE seal. As shown in the graph in FIG. 3, the ePTFE coated seal plot 310 showed the lowest coefficient of friction over time (COF just over 0.1 in the course of 2000 seconds), with the amorphous carbon-filled PTFE seal plot 312 coming in a close second (COF between 0.1 and 0.2 over 2000 seconds). The glass fiber-filled PTFE seal plot 314 showed a dramatic increase of coefficient of friction to a higher value (COF between 0.3 and 0.5 over 2000 seconds) after the seal started to wear off. It is also notable from the data that the wear process of the glass fiber-filled PTFE seal also accelerated over time. In comparison, although there is a small amount of seal wear, plot 310 and plot 312 show steady low friction and no significant wear of the seal.

Example 2

Four injectors (pictured as FIGS. 4A, 4B, 4C and 4D, respectively) made for a SIDI engine were durability tested. The injectors in FIGS. 4A and 4B had a carbon-filled PTFE (black) seal near the tip of the injector at the area of contact with an injector bore of a combustion chamber. The injectors in FIGS. 4C and 4D had a glass fiber-filled PTFE (white) seal near the tip of the injector at the area of contact with an injector bore of a combustion chamber.

The first injector (FIG. 4A) was subjected to durability testing with a SIDI V4 isolator and the seal on the first injector is about 10% thicker to provide about 12% extra compression for its sealing function compare to other seals. After being subjected to these conditions, the first injector was found 100% "clean" of deposits related to combustion blow-by, indicating no seal wear and no leakage from combustion chamber. Minimum wear (only slight smearing of material on the surface) was observed on the OD surface of this black seal.

The second injector (FIG. 4B) was subjected to durability testing with a SIDI V4 isolator and at nominal fit compression. After being subjected to these conditions, the second injector was found to have an approximately 2.5 mm strip of visible but unknown composition deposits above the seal. Although no chemical analysis was performed on the 2.5 mm strip of visible deposit, it was not necessarily blow-by because the seal showed no wear. No wear track, even at the micron level, was observed on the OD surface of this black seal.

The third injector (FIG. 4C) was subjected to durability testing with a SIDI V4 isolator and at nominal fit compression. After being subjected to these conditions, the third injector was found to have an approximately 2.5 mm strip of visible but unknown composition deposits above the seal. Although no chemical analysis was performed on the 2.5 mm strip of visible deposit, it was not necessarily blow-by because the seal showed very little wear. Specifically, the seal appears to have a ~50 micron wear band on its OD surface on the side closer to the combustion chamber. The wear depth is shallower, and no obvious broken glass fiber can be seen in SEM.

The fourth injector (FIG. 4D) was subjected to durability testing with a SIDI V1 isolator and at nominal fit compression. After being subjected to these conditions, the fourth injector was found to have an approximately 8 mm strip of deposits above the seal. Chemical analysis confirmed that the deposit is consistent with combustion blow-by above the seal. Specifically, the seal appears to have been worn off and some leak from the combustion chamber appears to have occurred. A wear track was about 300 microns wide, consistent with the amplitude of the micro-motion of the injector, was observed at the OD surface on the edge closer to the combustion chamber. SEM pictures show broken glass fibers in the wear track. These broken fibers are believed to accelerate wear of the aluminum injector bore, thus causing eventual leakage and blow-by. Thus, the deposits in FIG. 4D are different than the black that one sees on the flat aluminum segments in FIG. 4C which is the debris of seals result from continued friction and contact of seals with the injector bore.

Example 3

A pin on disk friction test was conducted. Five seals were rotated and/or pulsated 10,000 laps (~380 meters) against five flat, aluminum surfaces respectively. The flat, aluminum surfaces were machined to have approximately the same roughness as the injector bore. The pin used in the friction test had seals attached around them so that a circular surface edge of each seal rubbed against the respective aluminum surfaces. The first two of the seals, shown in FIGS. 5A and 5B, had carbon-filled PTFE seals attached around the pins. The next two of the seals, shown in FIGS. 5C and 5D, had glass fiber-filled PTFE seals attached around the pins. The flat, aluminum surface of FIGS. 5A and 5C had surface roughness, $R_z=2$ microns, while the flat aluminum surface of FIGS. 5B and 5D had surface roughness, $R_z=6$ microns. The last seal, which was applied to an aluminum segment shown in FIG. 6, had a coating portion 20 of ePTFE adhered onto a glass fiber-filled PTFE seal, the coated seal being attached around the pin. As shown, the carbon-filled PTFE seals of FIGS. 5A and 5B left noticeably less visible circular wear debris on their respective aluminum surfaces than the glass fiber-filled PTFE seals of FIGS. 5C and 5D. However, the ePTFE-coated seal of FIG. 6 clearly left the least amount of wear debris, the deposits being isolated and not even enough to leave a solid circle outline on the aluminum surface otherwise seen in contrast to FIGS. 5A, 5B, 5C and 5D.

Figure 6:
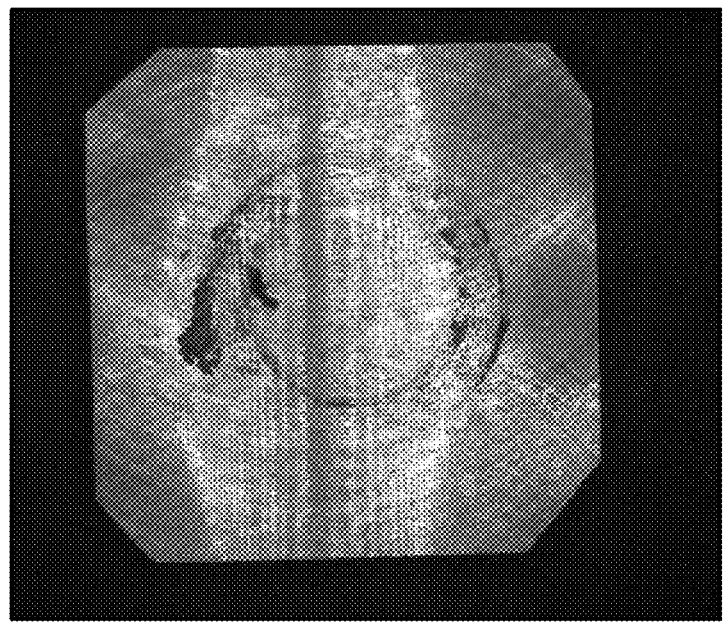
FIG. 6 is a photograph of an aluminum segment taken after a pin on disk friction test of a coated seal according to an embodiment of the present disclosure.
Figure 7A:
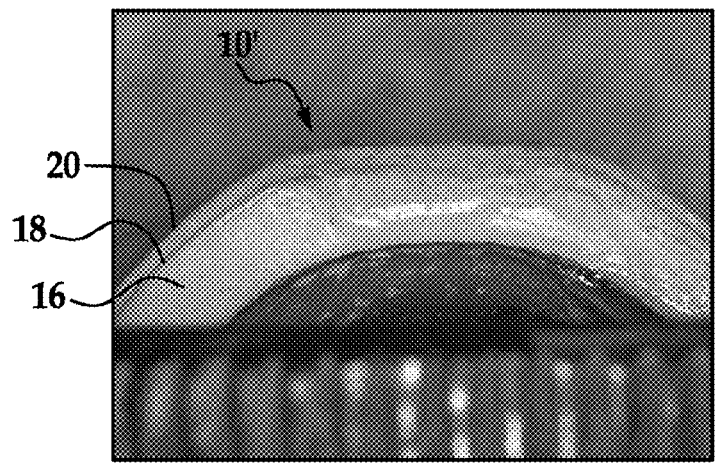
FIGS. 7A and 7B are photographs of the side-view of an expanded polytetrafluoroethylene (ePTFE) coated glass-fiber filled PTFE seal according to an embodiment of the present disclosure attached to a pin taken before (FIG. 7A) and after (FIG. 7B) a pin on disk friction test.
Figure 7B:
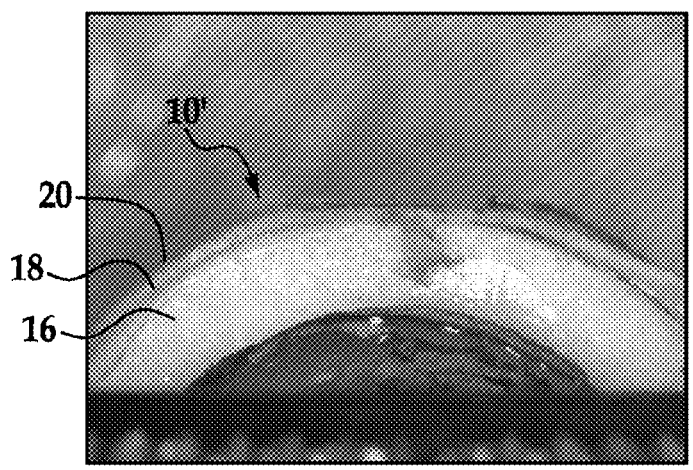

FIGS. 7A and 7B are close-up photographs of portions of the ePTFE-coated seal 10' discussed above, which left almost no wear debris on the aluminum surface shown in FIG. 6. FIG. 7A is a photograph of the portion of the ePTFE-coated seal 10' before being subjected to the ~10,000 laps (~380 meters) rotation/pulsation against the aluminum surface at a sliding speed of 0.2 meters/second. FIG. 7B is a photograph of the same portion of the ePTFE-coated seal 10' after being subjected to the ~10,000 laps (~380 meters) rotation. As the photos show, there is no visible evidence of de-adhering or wearing off of the ePTFE coating portion 20 from the glass fiber-filled PTFE seal 16.

While several embodiments have been described in detail, it will be apparent to those skilled in the art that the disclosed embodiments may be modified. Therefore, the foregoing description is to be considered exemplary rather than limiting.

The invention claimed is:

1. A coated seal for sealing parts in a vehicle engine, the seal comprising:
a seal body portion including glass fiber-filled polytetrafluoroethylene, carbon-filled polytetrafluoroethylene, molybdenum disulfide-filled polytetrafluoroethylene, bronze-filled polytetrafluoroethylene or combinations thereof; and
a coating portion adhered to at least one side of the seal body portion, the coating portion forming from about 5 vol % to about 25 vol % of the coated seal, the coating portion including expanded polytetrafluoroethylene, carbon-filled polytetrafluoroethylene, or combinations thereof, the coating portion having a coefficient of friction of less than 0.25 when subjected to a pressure of about 100 MPa for a travel distance of at least 380 meters at a sliding speed of 0.2 meters/second.

2. The coated seal of claim 1 wherein the coating portion has a coefficient of friction of less than 0.1 when subjected to a pressure of about 100 MPa for a travel distance of at least 380 meters at a sliding speed of 0.2 meters/second.

3. The coated seal of claim 1 wherein the coating portion forms from about 10 vol % to about 20 vol % of the coated seal.

4. The coated seal of claim 1 wherein the coating portion includes expanded polytetrafluoroethylene, and the expanded polytetrafluoroethylene coating portion has a thickness of from about 0.004 inch to about 0.012 inch on the coated seal.

5. The coated seal of claim 1 wherein an adhesive layer is provided between the coating portion and the seal body portion, the adhesive layer including polymer-based adhesive.

6. The coated seal of claim 5 wherein an inner portion of the coating portion includes expanded polytetrafluoroethylene having pores therein with polymer-based adhesive substantially filling the pores, the polymer-based adhesive from the pores providing at least some adhesive to the adhesive layer.

7. The coated seal of claim 6 wherein the polymer-based adhesive is a thermosetting epoxy resin.

8. The coated seal of claim 1 wherein the coating portion is directly adhered to the seal body portion without an adhesive layer positioned therebetween.

9. The coated seal of claim 1 wherein the coating portion is formed from carbon-filled polytetrafluoroethylene, the carbon comprising from about 10 vol % to about 30 vol % of the carbon-filled polytetrafluoroethylene coating portion.

10. The coated seal of claim 9 wherein the carbon in the carbon-filled polytetrafluoroethylene coating portion is graphite.

11. The coated seal of claim 10 wherein the graphite is high purity coke powder.

12. The coated seal of claim 1 wherein the seal body portion includes glass fiber-filled polytetrafluoroethylene, the glass fibers being from about 5 vol % to about 30 vol % of the glass-fiber filled polytetrafluoroethylene seal body portion.

13. A vehicle engine having an injector, comprising:
a coated seal operatively disposed directly to at least one surface of the injector in the vehicle engine, the coated seal including:
a seal body portion including glass fiber-filled polytetrafluoroethylene, carbon-filled polytetrafluoroethylene, molybdenum disulfide-filled polytetrafluoroethylene, bronze-filled polytetrafluoroethylene, or combinations thereof; and
a coating portion adhered to at least one side of the seal body portion, the coating portion forming from about 5 vol % to about 25 vol % of the coated seal, the coating portion including expanded polytetrafluoroethylene, carbon-filled polytetrafluoroethylene, or combinations thereof, the coating portion having a coefficient of friction of less than 0.25 when subjected to a pressure of about 100 MPa for a travel distance of at least 380 meters at a sliding speed of 0.2 meters/ second;

wherein the coated seal is configured to tolerate repeated vertical pulsing up and down, combustion pressures, and random side to side horizontal pressures in an injector bore of the vehicle engine;

and wherein the coated seal is configured to enable the injector to function with decreased friction, decreased noise and improved wear.

14. A method for forming a coated seal for sealing parts in a vehicle engine, comprising:

adhering a coating portion to at least one side of a seal body portion to form the coated seal, the seal body portion including glass fiber-filled polytetrafluoroethylene, carbon-filled polytetrafluoroethylene, molybdenum disulfide-filled polytetrafluoroethylene, bronze-filled polytetrafluoroethylene, or combinations thereof; and the coating portion forming from about 5 vol % to about 25 vol % of the coated seal, the coating portion including expanded polytetrafluoroethylene, carbon-filled polytetrafluoroethylene, or combinations thereof;

wherein the coating portion has a coefficient of friction of less than 0.25 when subjected to a pressure of about 100 MPa for a travel distance of at least 380 meters at a sliding speed of 0.2 meters/second.

15. The method of claim 14 wherein adhering is accomplished by:

applying heat, pressure or a combination thereof while the coating portion is positioned against the seal body portion; or applying polymer-based adhesive between the seal body portion and the coating portion.

16. The method of claim 14 wherein the coating portion comprises:

expanded polytetrafluoroethylene having pores therein; and polymeric adhesive substantially filling the pores, the polymeric adhesive adhering the coating portion to the seal body portion.

17. The method of claim 16 wherein the polymeric adhesive comprises a thermosetting epoxy resin.

18. The method of claim 14 wherein the coating portion is adhered as a sheet, an extrudate, or a tape to the at least one side of the seal body portion.

19. The method of claim 14 wherein the coated seal is operatively disposed on an injector in a spark ignition direct injection (SIDI) injection system or in an isolated spark ignition direct injection (SIDI) injection system.

20. The method of claim 14 wherein the coefficient of friction of the coating portion when applied to the injector is less than 0.1 when subjected to a pressure of approximately 100 MPa for a travel distance of at least 380 meters at a sliding speed of 0.2 meters/second.

* * * * *